United States Patent
Tan et al.

(10) Patent No.: US 10,243,211 B2
(45) Date of Patent: Mar. 26, 2019

(54) COMPOSITE-COATED LITHIUM IRON PHOSPHATE AND PREPARATION METHOD THEREFOR, AND LITHIUM ION BATTERY

(71) Applicant: INSTITUTE OF PROCESS ENGINEERING, CHINESE ACADEMY OF SCIENCES, Beijing (CN)

(72) Inventors: Qiangqiang Tan, Beijing (CN); Yuxing Xu, Beijing (CN)

(73) Assignee: INSTITUTE OF PROCESS ENGINEERING, CHINESE ACADEMY OF SCIENCES, Beijing (CN)

( * ) Notice: Subject to any disclaimer, the term of this patent is extended or adjusted under 35 U.S.C. 154(b) by 64 days.

(21) Appl. No.: 15/556,334

(22) PCT Filed: Sep. 18, 2015

(86) PCT No.: PCT/CN2015/089908
§ 371 (c)(1),
(2) Date: Sep. 7, 2017

(87) PCT Pub. No.: WO2016/141706
PCT Pub. Date: Sep. 15, 2016

(65) Prior Publication Data
US 2018/0097228 A1    Apr. 5, 2018

(30) Foreign Application Priority Data
Mar. 10, 2015  (CN) .......................... 2015 1 0104234

(51) Int. Cl.
| | |
|---|---|
| *H01M 4/52* | (2010.01) |
| *H01M 10/0525* | (2010.01) |
| *H01M 4/04* | (2006.01) |
| *H01M 4/36* | (2006.01) |
| *C01B 25/45* | (2006.01) |
| *H01M 4/58* | (2010.01) |
| *H01M 4/62* | (2006.01) |
| *B82Y 40/00* | (2011.01) |
| *H01M 10/052* | (2010.01) |
| *B82Y 30/00* | (2011.01) |

(52) U.S. Cl.
CPC .............. *H01M 4/52* (2013.01); *C01B 25/45* (2013.01); *C01B 25/451* (2013.01); *H01M 4/0419* (2013.01); *H01M 4/0471* (2013.01); *H01M 4/366* (2013.01); *H01M 4/5825* (2013.01); *H01M 4/62* (2013.01); *H01M 4/625* (2013.01); *H01M 10/0525* (2013.01); *B82Y 30/00* (2013.01); *B82Y 40/00* (2013.01); *H01M 10/052* (2013.01)

(58) Field of Classification Search
None
See application file for complete search history.

(56) References Cited

FOREIGN PATENT DOCUMENTS

| | | |
|---|---|---|
| CN | 101237036 A | 8/2008 |
| CN | 101710615 A | 5/2010 |
| CN | 102347475 A | 2/2012 |
| CN | 102420323 A | 4/2012 |
| CN | 102683697 A | 9/2012 |
| CN | 103259013 A | 8/2013 |
| CN | 103366971 A | 10/2013 |
| CN | 103794760 A | 5/2014 |
| CN | 104078248 A | 10/2014 |
| CN | 104716320 A | 6/2015 |
| WO | 2014128190 A1 | 8/2014 |

OTHER PUBLICATIONS

Boyano, et al. "Preparation of C—LiFePO4/polypyrrole lithium rechargeable cathode by consecutive potential steps electrodeposition," Journal of Power Sources, vol. 195 (2010), pp. 5351-5359.
Patent Cooperation Treaty (PCT), International Search Report and Written Opinion for Application PCT/CN2015/089908 filed Sep. 18, 2015, dated Dec. 25, 2015, International Searching Authority, CN.

*Primary Examiner* — Sarah A. Slifka
(74) *Attorney, Agent, or Firm* — McDonald Hopkins LLC

(57) ABSTRACT

A composite-coated lithium iron phosphate in a three-dimensional nanonetwork layered structure and a preparation method therefor, and a lithium ion battery, wherein a composite is prepared by compounding a conducting polymer, graphene and a carbon nano tube. The preparation method for the coated lithium iron phosphate comprises the following steps: doping the composite and anhydrous ferric phosphate in situ in the process of preparing the anhydrous ferric phosphate, serving as a lithium iron phosphate precursor, then mixing the composite in-situ doped anhydrous ferric phosphate, a lithium source, a traditional carbon material and a solvent to obtain slurry, spray drying the slurry, and calcining to obtain the composite-coated lithium iron phosphate in a three-dimensional nanonetwork layered structure. The preparation method is simple and has a wide raw material source, low cost and very broad practical application prospect. Serving as an anode material of the lithium ion battery, the coated lithium iron phosphate has higher electrical conductivity and cycling stability, and more excellent comprehensive electrochemical performance.

20 Claims, No Drawings

COMPOSITE-COATED LITHIUM IRON PHOSPHATE AND PREPARATION METHOD THEREFOR, AND LITHIUM ION BATTERY

CROSS-REFERENCE TO RELATED APPLICATION

This application is a 35 U.S.C. 371 national stage filing of PCT Application No. PCT/CN2015/089908 filed on Sep. 18, 2015, which claims priority to Chinese Patent Application No. 201510104234.5 filed on Mar. 10, 2015, each of which are incorporated herein in their entirety by reference.

TECHNICAL FIELD

The present invention belongs to the field of new energy materials, and relates to a lithium iron phosphate coated by a composite material having a three-dimensional nano-network layered structure, a preparation process therefor and a lithium ion battery.

BACKGROUND ART

Advanced cathode material for lithium-ion battery is the key to promote the continuous development of the lithium-ion battery technology, even more the core technology of power battery replacement. Therefore, the development of low-cost, high-performance lithium iron phosphate ($LiFePO_4$) has important practical significance. Although $LiFePO_4$ cathode material has many outstanding advantages, there are still problems which are not completely solved, e.g. high cost of raw materials, low conductivity, poor magnification performance, low tap density. The following typical studies have been carried out to address these issues.

I. Researches on Improving the Preparation Process and Reducing the Cost

In recent years, it is reported that the precursor ferric phosphate ($FePO_4$) was prepared first, and then reacted with lithium salt to prepare $LiFePO_4$ cathode material, and some certain research results have been obtained. However, on the one hand, the cost for the iron source used in these preparation methods is higher, for example, using $P_2O_5$ and ferrous powder (Guan-nan Hao, Hao Zhang, Xiao-hong Chen, et al. A novel method for preparing pomegranate-structured $FePO_4$/C composite materials as cathode for lithium-ion batteries [J]. Materials Research Bulletin, 47: 4048-4053, 2012), ferric chloride (Seunghoon Nam, Sungun Wi, Changwoo Nahm, et al. Challenges in synthesizing carbon-coated $LiFePO_4$ nanoparticles from hydrous $FePO_4$ and their electrochemical properties [J]. Materials Research Bulletin, 47: 3495-3498, 2012), ferric nitrate (Zhongqing Jiang, Zhongjie Jiang. Effects of carbon content on the electrochemical performance of $LiFePO_4$/C coreshell nano-composites fabricated using $FePO_4$ polyaniline as an iron source [J]. Journal of Alloys and Compounds, 537: 308-317, 2012), ferrous chloride (Li Chen, Yongqiang Yuan, Xiafeng, et al. Enhanced electrochemical properties of $LiFe_{1-x}M_nPO_4$/C composites synthesized from $FePO_4 \cdot 2H_2O$ nanocrystallites [J]. Journal of Power Sourecs, 214: 344-350, 2012) and the like as the raw materials. Moreover, low-value by-product salts will be produced during the reaction process, such as $NaNO_3$, NaCl and the like. Meanwhile, the by-product salts are present in the mother liquor produced from the reaction, as well as the washing liquid of iron phosphate, and will pollute the environment if being emitted directly. The processing thereof will increase the cost.

On the other hand, the prepared $FePO_4$ precursor contains crystal water, which leads to the fact that the actual components cannot be reliably determined, and brings some difficulties to the precise batching. Moreover, since the water contained in the $FePO_4$ precursor affects the oxygen content in the protective atmosphere, it is impossible to ensure that all of the ferric iron is reduced to ferrous iron during the sintering process. In addition, the products containing crystal water may produce moisture absorption or weathering phenomenon in the long-term storage process, so that the product components change over time, to adversely affect the stability of the process and product consistency.

Therefore, ferrous sulfate from the by-product of titanium dioxide as raw material, and inexpensive oxygen instead of commonly used hydrogen peroxide as an oxidant are used to prepare anhydrous $FePO_4$ precursor by the introduction of microwave drying technology, which can achieve multiple purposes such as waste recycling, clean production, lowering the cost, and improving the electrochemical performance.

II. Research on Increasing the Conductivity

1. Doping and Coating Technology of Traditional Inactive Carbon Materials

At present, doping or coating various conductive agents is the main method to improve the conductivity of $LiFePO_4$. Among them, researches on carbon coating are relatively more, and the technology thereof is relatively mature. When carbon coating of $LiFePO_4$ is carried out, carbon can not only prevent oxidation of $Fe^{2+}$ as a reducing agent, but also prevent the agglomeration of crystal grains and increase the conductivity of $LiFePO_4$ as a conductive agent. The results show that $LiFePO_4$/C composites in situ carbon coated have better electrochemical performance than those in situ carbon doped. The most commonly used carbon source materials include citric acid, sucrose, glucose, starch, organic acid and the like.

Jing Liu (Synthesis of the $LiFePO_4$/C core-shell nanocomposite using a nano-$FePO_4$/polythiophene as iron source [J]. Journal of Power Spurces, 197: 253-259, 2012) discloses using citric acid as carbon source to synthesize $LiFePO_4$/C composites having a core-shell structure by the solid phase method and having an initial discharge specific capacity of 151 mAh/g at 0.1 C magnification. Shuping Wang (Shuping Wang, Hongxiao Yang, Lijun Feng, et al. A simple and inexpensive synthesis route for $LiFePO_4$/C nanoparticles by co-precipitation [J]. Journal of Power Spurces, 233: 43-46, 2013) discloses using glucose as carbon source to synthesize $LiFePO_4$/C composites having a carbon layer having a thickness of 2 nm by the coprecipitation method, and having a discharge specific capacity of 100 mAh/g at 10 C magnification, and having better magnification performance and cycle stability. Ching-Yu Chiang (Ching-Yu Chiang, Hui-Chia Su, Pin-Jiun Wu, et al. Vanadium substitution of $LiFePO_4$ cathode materials to enhance the capacity of $LiFePO_4$-based lithium-ion batteries [J]. The Journal of Physical Chemistry. 116: 24424-24429, 2012) discloses using LiOH, $FeC_2O_4 \cdot 2H_2O$, $NH_4 \cdot H_2PO_4$ and citric acid as raw materials, saccharose as the carbon source, sintering at a high temperature of 800° C. to prepare vitriol-doped $LiFePO_4$/C composite cathode material by the modified sol-gel process, having a discharge specific capacity of 155 mAh/g at 0.1 C Magnification.

2. Doping and Coating Technology of Active Carbon Materials

Recent studies have shown that doping or coating active carbon materials, such as conductive polymers, graphene and carbon nanotubes, can effectively enhance the conductivity and electrochemical performance of $LiFePO_4$.

Polypyrrole having a theoretical specific capacity of 72 mAh/g can act as a conductive agent on the surface of $LiFePO_4$ and enhance its conductivity, and also exhibit the activity of the cathode material. Therefore, it is highly concerned by researchers at home and abroad. Research by Hai Jia (Preparation and Performance research of Polypyrrole-coated $LiFePO_4$ [J]. Power Technology, 36(11): 1610-1613, 2012) shows that $LiFePO_4$ prepared by the solvothermal method has a discharge specific capacity of 105.6 mAh/g at 1 C magnification after coating with PPy. Yi-Ping Liang (Hydrothermal synthesis of lithium iron phosphate using pyrrole as an efficient reducing agent [J]. Electrochimica Acta, 87(1): 763-769, 2013) discloses $LiFePO_4$/PPy composites prepared by the hydrothermal method has a discharge specific capacity of 153 mAh/g at 0.2 C magnification. The addition of PPy not only increases the conductivity of $LiFePO_4$ as a conductive agent, so as to improve the cycle performance, but also acts as a reducing agent during the subsequent sintering process, so as to reduce $Fe^{3+}$ produced during the reaction into $Fe^{2+}$.

Since the discovery by K S Novoselov in 2004, the application researches on graphene in various fields have attracted significant attentions due to its remarkable advantages, such as high specific surface area, high conductivity, high mechanical strength and good softness. In recent years, the doping modification researches of graphene on $LiFePO_4$ cathode material have also made good progress. Xiaohua Ma (Study on the Electrical Properties of Nanocrystalline Lithium Iron Phosphate/Graphene/Carbon Composites [J]. New Materials Industry, 2:71-75, 2011) from Fudan University discloses using ethylene glycol as a solvent to in situ synthesize a nanoscale $LiFePO_4$/Graphene/Carbon Composite with good uniformity at 250° C. by the solvothermal method, so that $LiFePO_4$ is uniformly dispersed on graphene sheet; graphene provides passageway to $Li^+$ migration and enhances the electrochemical performance of the composites.

Carbon nanotubes have high conductivity, large specific surface area utilization efficiency, and have lithium storage performance. The application thereof in $LiFePO_4$ has become a hotspot. Research from Youyi Peng (A Study on the $LiFePO_4$/MWCNTs cathode materials for Li ion batteries [J]. Electrochemistry, 15(3):331-335, 2009) shows that $LiFePO_4$/MWCNTs electrode having a MWCNT content of 10 wt. % has better charge-discharge performance than other composite electrode having other ratios, and has small polarization, strong stability, more stable charge-discharge platform, and higher conductivity.

In view of the high cost, poor conductivity and cycle stability of $LiFePO_4$ cathode materials, there are still some problems in the improvement of the latest researches at home and abroad. In the raw materials used for the preparation of $LiFePO_4$, most of the iron sources are oxalate, nitrate, organic salts and the like. Phosphates are obtained more from ammonium salts thereof, which will lead to increased product cost, and even generation of environmentally unfriendly gas, such as nitrogen oxides and ammonia, so as not to be conducive to large-scale industrial applications. Iron source in the raw materials used in the synthesis route of novel $FePO_4$ precursor has a high cost; the $FePO_4$ precursor contains crystal water, which brings some difficulties to the precise batching and affects the process stability. Although coating carbon on the surface of $LiFePO_4$ can effectively increase the electronic conductivity, limit further increase of the particle size and achieve the object of controlling the particle size, the addition of carbon will decrease the tap density, so as to further reduce the volume and mass specific energy since carbon has a lighter mass and is non-active substance.

Recently, it has been reported that polypyrrole and graphene are compounded to prepare supercapacitor electrode materials; graphene and carbon nanotubes are compounded, and polypyrrole, graphene and carbon nanotubes are compounded to prepare gas-sensitive materials. However, there is no report as of now that polypyrrole, graphene, carbon nanotubes and conventional non-active carbon materials have been commonly doped to increase the conductivity and electrochemical performance of $LiFePO_4$ by the synergistic effect therebetween.

DISCLOSURE OF THE INVENTION

For the above problems in the research process of lithium iron phosphate, the effective combination of the following four substances, the intrinsic conducting polymers, such as polypyrrole, having high conductivity, high stability and better cathode material activity, graphene having high conductivity and being able to provide better transmission channel for $Li^+$, carbon nanotubes having high conductivity, large specific surface area and better lithium storage performance, traditional carbon source (glucose, sucrose, citric acid and the like) having better conductivity and reducibility, not only can increase the conductivity of $LiFePO_4$ by introducing the conducting polymers, such as polypyrrole, but also can effectively combine a small amount of graphene, carbon nanotube and traditional carbon materials to realize complementary advantages of various materials and to increase the tap density, conductivity and cycle stability of $LiFePO_4$.

The first object of the present invention lies in providing a lithium iron phosphate coated by a composite material having a three-dimensional nano-network layered structure. The lithium iron phosphate of the present invention has high conductivity and tap density.

In order to achieve the aforesaid object, the present invention discloses the following technical solution,
  a lithium iron phosphate coated by a composite material having a three-dimensional nano-network layered structure, wherein the composite material is prepared by compounding a conducting polymer, graphene and a carbon nanotube.

Preferably, the conducting polymer is in an amount of 45-99.99 mass % of the composite material.

Preferably, said graphene and carbon nanotube are in an amount of 0.01-55 mass % of the composite material.

Preferably, said composite material is in an amount of 0.01-15 mass % of the coated lithium iron phosphate.

Preferably, lithium, iron, phosphorus in the coated lithium iron phosphate are in a molar ratio of 0.99-1.03:1:1, preferably 1-1.028:1:1, further preferably 1.005-1.025:1:1.

Preferably, the conducting polymer is one selected from the group consisting of polypyrrole, polyaniline, polythiophene and polyoxyethylene, or a mixture of two or more selected therefrom, or a copolymer of two or more selected from the aforesaid polymer monomers.

Preferably, said carbon nanotube is one selected from the group consisting of single-wall or multi-wall carbon nanotubes, or a mixture of two or more selected therefrom, preferably multi-wall carbon nanotubes.

Preferably, said carbon nanotube is acidized.

Preferably, the composite material is prepared by the following process, comprising, (1) adding a surfactant into dispersed graphene oxide, dispersing sufficiently, then adding hydrazine hydrate, making the surfactant form micelle between the graphene layers during the process that graphene oxide is reduced by hydrazine hydrate, separating the product, e.g. centrifuging, to remove excessive surfactant, to obtain a reduced graphene which forms micelle between the graphene layers;

(2) dispersing the separated product in step (1) in a solvent and conducting ultrasonic treatment, then adding a conducting polymer or a monomer thereof, continuing the ultrasonic treatment for 30-60 min, adding ammonium persulphate and carbon nanotubes, stirring in an ice-water bath for polymerization for 18-24 h, separating the product, e.g. centrifuging, and drying to obtain a conducting polymer/graphene/carbon nanotube composite material having a three-dimensional nano-network layered structure.

Preferably, the surfactant in step (1) is one selected from the group consisting of cetyltrimethylammonium bromide, cetyltrimethylammonium chloride, sodium dodecyl sulfate and sodium dodecylbenzenesulfonate, or a mixture of two or more selected therefrom.

Preferably, said dispersion is carried out by ultrasonic waves.

Preferably, said carbon nanotubes in step (2) are added together with hydrazine hydrate during the process of preparing the reduced graphene in step (1).

Preferably, said solvent is one selected from the group consisting of ethanol, deionized water, inorganic protonic acid and chloroform solution of ferric chloride, or a mixture of two or more selected therefrom.

Preferably, said carbon nanotubes are acidized.

Preferably, said drying is carried out under vacuum at a temperature of 40-80° C., preferably 60° C.

Furthermore, in order to make the obtained conductive polymer/graphene/carbon nanotube composite material having a three-dimensional nano-network layered structure play a better role of enhancing the conductivity in $LiFePO_4$, it is possible to appropriately adjust the addition order of the surfactant and acidified carbon nanotubes, to choose other suitable surfactants, or to appropriately adjust the reaction conditions for better achieving the object of the present application.

The dispersed graphene oxide may be prepared by existing technologies, or by the following method, comprising: mixing concentrated sulfuric acid and phosphoric acid (such as in a volume ratio of 5-15:1, preferably 9:1), adding flake graphite, stirring quickly in an ice-water bath for 1-3 h, adding an appropriate amount of potassium permanganate, continuing to stir in an ice-water bath for 1-3 h, water-bathing respectively at 25-40° C., preferably 35° C. and 45-55° C., preferably 50° C., for 1-4 h, preferably 2 hs and 8-20 h, preferably 12 h, continuing to stir, adding appropriate amounts of ice water and hydrogen peroxide, centrifuging and filtering to obtain graphite oxide, dissolving said graphite oxide and a dispersant in the same mass (at least one selected from the group consisting of tri-sulfopropyltetradecyl dimethyl betaine, sodium dodecylbenzenesulfonate, Triton-100 ($C_{34}H_{62}O_{11}$) and lauryl sodium sulfate) in a mixed solution of anhydrous ethanol and deionized water, ultrasonically dispersing to obtain graphene oxide.

Acidification of carbon nanotubes can be prepared by adding an appropriate amount of carbon nanotubes to a mixture of concentrated sulfuric acid and concentrated nitric acid, wherein the volume ratio of concentrated sulfuric acid to concentrated nitric acid is (1.5-3.5):1, ultrasonically dispersing, refluxing in an oil bath at 100-130° C. for 1-4 h, diluting the solution with distilled water, remove the supernatant, rinsing several times until the pH value of the washing water is neutral, e.g. 7, suction filtering, e.g. by using polyethylene microporous membrane, washing to neutral, vacuum drying to get acidified carbon nanotubes.

The second object of the present invention further lies in providing a preparation process for the lithium iron phosphate coated by a composite material having a three-dimensional nano-network layered structure, comprising the following steps of in-situ doping the composite and anhydrous ferric phosphate during the process of preparing the anhydrous ferric phosphate, serving as a lithium iron phosphate precursor, then mixing the composite in-situ doped anhydrous ferric phosphate, a lithium source, a traditional carbon material and a solvent evenly by high energy ball milling to obtain a slurry, spray drying the slurry, and calcining to obtain a lithium iron phosphate coated by a composite material.

The present invention discloses, by introducing the conductive polymer with high electrochemical activity, good environmental stability and high conductivity, firstly preparing the anhydrous ferric phosphate in situ homogeneously doped with the conductive polymer/graphene/carbon nanotube composite material having a three-dimensional nano-network layered structure, and then in situ adding the traditional non-active carbon material during the subsequent synthesis of $LiFePO_4$, so as to play a dual role of a conductive agent and a reducing agent. Such design can effectively solve the prominent problems of uneven distribution of the conductive agent in $LiFePO_4$, low tap density and poor conductivity. It not only achieves a uniform distribution of the conductive agent in $LiFePO_4$, but also realizes multiple purposes such as improving the conductivity and cycle stability while reducing the non-active carbon content.

The preparation process of the present invention, which is simple, has a wide raw material source, a low cost and a very broad practical application prospect.

Preferably, the preparation process comprises the following steps:

(1) dispersing the composite material, ferrous sulfate and a phosphorus source in deionized water, adding an oxidant, reacting until no $SO_4^{2-}$ is detected in the solution, filtering, washing the reactant, vacuum drying and microwave drying successively to obtain an anhydrous ferric phosphate homogeneously doped in-situ by the composite material;

(2) mixing said anhydrous ferric phosphate homogeneously doped in-situ by the conductive polymer/graphene/carbon nanotube composite material having a three-dimensional nano-network layered structure in step (1), a lithium source, a traditional carbon material and a solvent evenly by high energy ball milling to obtain a slurry, spray drying the slurry, and calcining to obtain a lithium iron phosphate coated by the composite material having a three-dimensional nano-network layered structure.

As a preferred step, ferrous sulfate in step (1) is a product purified from ferrous sulfate from the by-product of the titanium dioxide plant, preferably maintaining the elements of Mg, Ti and Mn in the purified product ferrous sulfate, which are beneficial to the electrochemical performance of lithium iron phosphate, e.g. determining in the purification process by means of the solubility product rule whether the precipitation can be generated or dissolved under certain conditions, precisely controlling the ion concentration of the solution according to different solubility products of different metal ions, controlling the generation or dissolution of the precipitation, selectively choosing to maintain in the purified product ferrous sulfate the elements beneficial to the electrochemical performance of lithium iron phosphate, such as Mg, Ti and Mn.

Preferably, said reaction is carried out under rapid stirring at a temperature of 25-105° C., preferably 90-120° C. for 0.5-25 h.

Preferably, said vacuum drying is carried out at 80-100° C. for 3-20 h.

Preferably, said microwave drying is carried out at 300-550° C. for 为 3-20 h.

Preferably, said phosphorus source is one selected from the group consisting of phosphoric acid, ammonium dihydrogen phosphate, diammonium phosphate, triammonium phosphate, and phosphates of sodium, potassium and lithium, or a combination of two or more selected therefrom.

Preferably, said oxidant is one selected from the group consisting of hydrogen peroxide, sodium chloride, sodium hypochlorite, hypochlorous acid, oxygen, air, ozone-containing oxygen and ozone-containing air, or a combination of two or more selected therefrom. Preferably, the oxidant is added in an amount for controlling the pH of the system to be 1-6, e.g. 1.3, 2.5, 3.4, 4.6, 5.7 and the like.

Preferably, the initial concentration of the phosphorus source ranges from 0.04 mol/L to 1.05 mol/L, e.g. 0.07 mol/L, 0.15 mol/L, 0.4 mol/L, 0.8 mol/L, 0.95 mol/L, 1.02 mol/L and the like.

Preferably, P in said phosphorus source and $Fe^{2+}$ in ferrous sulfate have a molar ratio of 1.01-1.55:1, e.g. 1.07, 1.25, 1.33, 1.42, 1.49, 1.54 and the like.

Preferably, said detection is carried out by using a soluble barium salt, preferably barium chloride and/or barium nitrate solution, further preferably barium chloride and/or barium nitrate solution having a mass concentration of 20-50%, e.g. 35%.

Preferably, the lithium source in step (2) is one selected from the group consisting of lithium chloride, lithium bromide, lithium phosphate, lithium dihydrogen phosphate, dilithium hydrogen phosphate, lithium sulfate, lithium carbonate, lithium hydroxide, lithium acetate, lithium nitrate, lithium oxalate, lithium formate, lithium tert-butoxide, lithium benzoate and lithium citrate, or a combination of two or more selected therefrom, preferably one selected from the group consisting of lithium carbonate, lithium hydroxide, lithium acetate, lithium nitrate, lithium oxalate, lithium formate, lithium citrate and lithium tert-butoxide, or a combination of two or more selected therefrom, further preferably one selected from the group consisting of lithium carbonate, lithium hydroxide, lithium acetate and lithium oxalate, or a combination of two or more selected therefrom.

Preferably, said traditional carbon material is a soluble carbon-containing organic binder, preferably anyone selected from the group consisting of glucose, sucrose, cellulose, polyethylene glycol, polyvinyl alcohol, soluble starch, monocrystal/polycrystal crystal sugar, fructose, phenolic resin, vinyl pyrrolidone, epoxy resin, poly(sugar alcohol), polyvinylidene fluoride, polyvinyl chloride, urea-formaldehyde resin, polymethacrylate and furan resin, or a combination of two or more selected therefrom.

Preferably, said traditional carbon material is in an amount of 0.1-10 mass % of the coated lithium iron phosphate.

Preferably, said solvent is one selected from the group consisting of deionized water, anhydrous ethanol, diethyl ether, acetone, tetrahydrofuran, benzene, toluene and dimethylformamide, or a combination of two or more selected therefrom, preferably one selected from the group consisting of deionized water, anhydrous ethanol and acetone, or a combination of two or more selected therefrom.

Preferably, said calcination is carried out at 650-850° C. for 6-20 h. After calcination, the mixture was cooled to room temperature to obtain lithium iron phosphate coated by the composite material having a three-dimensional nano-network layered structure. The whole calcination and cooling process can be carried out in an inert atmosphere or a weak reducing atmosphere, which is at least one selected from the group consisting of a high-purity argon gas, a high-purity nitrogen gas and a mixture of a high-purity nitrogen gas or a high purity argon gas and hydrogen having a volume fraction of 1-5%.

The third object of the present invention further lies in providing a lithium ion battery, the cathode active substance of which comprises the lithium iron phosphate coated by a composite material having a three-dimensional nano-network layered structure of the present invention, or the lithium iron phosphate coated by a composite material having a three-dimensional nano-network layered structure, which is prepared according to the process of the present invention.

The discharge specific capacity of the lithium iron phosphate coated by the composite material having a three-dimensional nano-network layered structure according to the present invention is greater than 157.5 mAh/g at 0.1 C magnification, and the capacity retention rate after 150 cycles is more than 97.8%. The initial discharge specific capacity of the whole battery made of the lithium iron phosphate coated by the composite material having a three-dimensional nano-network layered structure as the cathode material is more than 138 mAh/g at 1 C magnification, and the capacity retention rate is more than 97.5% after 150 cycles. The lithium iron phosphate coated by the composite material having a three-dimensional nano-network layered structure and the lithium ion battery prepared from the lithium iron phosphate have the outstanding advantages of high specific capacity, good conductivity and cycle stability, and excellent magnification performance.

As compared to the prior art, the present invention has the following prominent advantages and beneficial effects.

(1) Anhydrous $FePO_4$ precursor having a high value-added is prepared by using ferrous sulfate from cheap by-product of titanium dioxide, so as to achieve the objects of determining in the purification process of ferrous sulfate by means of the solubility product rule whether the precipitation can be generated or dissolved under certain conditions, precisely controlling the ion concentration of the solution according to different solubility products of different metal ions, controlling the generation or dissolution of the precipitation, selectively choosing to maintain in the purified product ferrous sulfate the elements beneficial to the electrochemical performance of lithium iron phosphate, such as Mg, Ti and Mn. The present invention achieves not only the use of waste resources recycling, but also the environmental pollution-free whole process, and ultimately gets cathode material for lithium ion battery $LiFePO_4$ having a high conductivity and a high tap density, and has inventiveness.

(2) During the preparation of anhydrous $FePO_4$ precursor, ferrous sulfate from cheap by-product of titanium dioxide and phosphoric acid are used as raw materials; during the process of precipitation, cheap and environmentally friendly oxygen is passed into as an oxidant.

Only a very small amount of hydrogen peroxide is needed, which is different from the current reports which disclose completely using hydrogen peroxide as an oxidant, saves the cost, is environmentally friendly and more suitable for industrial application.

(3) Through delicate design and selection of suitable process route, microwave drying process is introduced to successfully prepare anhydrous $FePO_4$ precursor having good crystallinity, which is different from the common drying method in the existing study causing that $FePO_4$ precursor contains crystal water, and the number of crystal water cannot be accurately determined, which will inevitably affect the follow-up weighing ingredients and the electrochemical performance of the final product $LiFePO_4$. The preliminary research results of this project show that anhydrous $FePO_4$ precursor obtained by the microwave drying process can synthesize $LiFePO_4$ having high performances.

(4) The conductive polymer/graphene/carbon nanotube composite material having a three-dimensional nano-network layered structure and traditional non-active carbon material are combined together to in site dope $LiFePO_4$, greatly enhance the conductivity thereof, magnification performance and cycle stability, so that $LiFePO_4$ cathode material having high performances is obtained and inventive.

(5) A conductive polymer having high electrochemical activity, good environmental stability and high conductivity was introduced. First, a conductive polymer/graphene/carbon nanotube composite material having a three-dimensional nano-network layered structure is prepared. Then, $FePO_4$ precursor particles are in situ dispersed homogeneously on the surface of the conductive polymer/graphene/carbon nanotube composite material during the process of preparing the precursor $FePO_4$, and the traditional non-active carbon materials such as citric acid, glucose, sucrose and the like are in situ added during the subsequent synthesis of $LiFePO_4$, so as to make it play a dual role of a conductive agent and a reducing agent. The design can effectively solve the prominent problems of uneven distribution of the conductive agent in $LiFePO_4$ cathode material, low tap density and poor conductivity. It not only realizes the uniform distribution of the conductive agent in the $LiFePO_4$ cathode material, but also achieves the multiple purposes of improving the conductivity and cycle stability thereof while reducing the non-active carbon content in the $LiFePO_4$ cathode material.

EMBODIMENTS

In order to better illustrate the present invention and understand the technical solution of the present invention, the typical but non-limitative examples of the present invention are stated as follows.

Example 1

(1) Preparation of a Polypyrrole/Graphene/Carbon Nanotube Composite Material Having a Three-Dimensional Nano-Network Structure ① Preparation of Graphene Oxide After mixing concentrated sulfuric acid and phosphoric acid with a volume ratio of 9:1, adding flake graphite, quickly stirring in an ice-water bath for 1 h, adding an appropriate amount of potassium permanganate and continuing to stir in the ice-water bath for 3 h, then water bathing respectively at 35° C. and 50° C. for 2 h and 12 h and continuously stirring, adding appropriate amounts of ice water and hydrogen peroxide, centrifuging and filtering to obtain graphite oxide, ultrasonically stripping to obtain graphene oxide.

② Acidification of Carbon Nanotubes

Adding an appropriate amount of carbon nanotubes to a certain amount of a mixed solution of concentrated sulfuric acid and concentrated nitric acid, ultrasonically dispersing and refluxing in an oil bath at 130° C. for 1 h, diluting the solution with distilled water, removing the supernatant and repeatedly rinsing several times, filtering with polyethylene microporous membrane, water washing to neutral, vacuum drying to obtain acidified carbon nanotubes.

The weighing was made according to the following ratio. Polypyrrole was in an amount of 45 mass % of the composite material having a three-dimensional nano-network layered structure, and graphene and carbon nanotubes were in a total amount of 55 mass % of the composite material having a three-dimensional nano-network layered structure.

An appropriate amount of cetyltrimethylammonium bromide was added to the dispersed graphene oxide in step (1), ultrasonically dispersed sufficiently. Then hydrazine hydrate was added, to make the surfactant form micelle between the graphene layers during the process of reducing graphene oxide by hydrazine hydrate. The product is centrifuged to remove excessive active surfactant to obtain reduced graphene which forms micelle between the graphene layers. The reduced graphene was dispersed in a mixed solution of ethanol and deionized water for ultrasonic treatment. Then, a pyrrole monomer was added to continue the ultrasonic treatment for 60 min. Ammonium persulfate and acidified carbon nanotubes were added, stirred and polymerized in an ice-water bath for 18 h. The product was centrifuged and vacuum dried at 60° C. to obtain a black powder, which was a polypyrrole/graphene/carbon nanotube composite material having a three-dimensional nano-network structure.

(2) Preparation of Lithium Iron Phosphate Coated by a Composite Material Having a Three-Dimensional Nano-Network Layered Structure According to a molar ratio of lithium, iron and phosphorus of 0.99:1:1 and the mass percent of 15% of the composite material having a three-dimensional nano-network layered structure in the coated lithium iron phosphate, the polypyrrole/graphene/carbon nanotube composite material having a three-dimensional nano-network structure, ferrous sulfate purified from ferrous sulfate from the by-product of titanium dioxide and phosphoric acid were dispersed in deionized water, wherein the initial concentration of phosphoric acid was 0.5 mol/L, and the molar ratio of P in phosphoric acid and $Fe^{2+}$ in ferrous sulfate was 1.01:1. Hydrogen peroxide was added to control the pH of the system to 1. The reaction was carried out at 25° C. for 25 h. Then quick stirring reaction was carried out until the solution contained no $SO_4^{2-}$, which was detected by barium chloride solution having a mass concentration of 35%. The reactants were filtered, washed for several times, vacuum dried sufficiently at 80° C., then microwave dried at 550° C. for 3 h to obtain anhydrous ferric phosphate in situ homogeneously doped with polypyrrole/graphene/carbon nanotube having a three-dimensional nano-network structure.

The above-mentioned doped anhydrous iron phosphate, lithium carbonate, polyvinyl alcohol having a mass percent of 0.1% of the total mass of the coated lithium iron phosphate, deionized water and ethanol were mixed uniformly by high energy ball milling to obtain a slurry. The slurry was spray dried, calcined at 850° C. for 6 h in high purity nitrogen to obtain lithium iron phosphate coated by the composite material having a three-dimensional nano-network layered structure.

The discharge specific capacity of the lithium iron phosphate coated by the composite material prepared in this example was 157.6 mAh/g at 0.1 C magnification, and the capacity retention rate after 150 cycles was 98%. The initial discharge specific capacity of the whole battery made of the coated lithium iron phosphate was 138.5 mAh/g at 1 C magnification, and the capacity retention rate was 97.8% after 150 cycles.

Example 2

(1) Preparation of a polythiophene/graphene/carbon nanotube composite material having a three-dimensional nano-network structure by the method as the same as Example 1, except for ① during the preparation of graphene oxide, the flaky graphite was added and quickly stirred in an ice-water bath for 3 h; an appropriate amount of potassium permanganate was added to continue the stirring in the ice-water bath for 1 h; and ② when the carbon nanotubes were acidified, carbon nanotubes were ultrasonically dispersed in a mixture of concentrated sulfuric acid and concentrated nitric acid and refluxed in an oil bath at 100° C. for 4 h.

The weighing was made according to the following ratio. Polythiophene was in an amount of 99.99 mass % of the composite material having a three-dimensional nano-network layered structure, and graphene and carbon nanotubes were in a total amount of 0.01 mass % of the composite material having a three-dimensional nano-network layered structure. According to the method in Example 1, the pyrrole monomer was replaced with a thiophene monomer. The thiophene monomer was added to continue the ultrasonic treatment for 30 min. Ammonium persulfate and acidified carbon nanotubes were added, stirred and polymerized in an ice-water bath for 18 h. The product was centrifuged and vacuum dried at 60° C. to obtain a black powder, which was a polythiophene/graphene/carbon nanotube composite material having a three-dimensional nano-network structure.

(2) Preparation of Lithium Iron Phosphate Coated by a Composite Material Having a Three-Dimensional Nano-Network Layered Structure According to a molar ratio of lithium, iron and phosphorus of 1.028:1:1 and the mass percent of 0.01% of the composite material having a three-dimensional nano-network layered structure in the coated lithium iron phosphate, the polythiophene/graphene/carbon nanotube composite material having a three-dimensional nano-network structure, ferrous sulfate purified from ferrous sulfate from the by-product of titanium dioxide and ammonium dihydrogen phosphate were dispersed in deionized water, wherein the initial concentration of ammonium dihydrogen phosphate was 0.04 mol/L, and the molar ratio of P in ammonium dihydrogen phosphate and $Fe^{2+}$ in ferrous sulfate was 1.2:1. Sodium hypochlorite was added to control the pH of the system to 6. The reaction was carried out at 50° C. for 0.5 h. Then quick stirring reaction was carried out until the solution contained no $SO_4^{2-}$, which was detected by barium chloride solution having a mass concentration of 35%.

The reactants were filtered, washed for several times, vacuum dried sufficiently at 100° C., then microwave dried at 300° C. for 20 h to obtain anhydrous ferric phosphate in situ homogeneously doped with polythiophene/graphene/carbon nanotube having a three-dimensional nano-network structure.

The above-mentioned doped anhydrous iron phosphate, lithium carbonate, a mixture of glucose and polyethylene glycol having a mass percent of 10% of the total mass of the coated lithium iron phosphate and deionized water were mixed uniformly by high energy ball milling to obtain a slurry. The slurry was spray dried, calcined at 650° C. for 20 h in high purity argon to obtain lithium iron phosphate coated by the composite material having a three-dimensional nano-network layered structure.

The discharge specific capacity of the lithium iron phosphate coated by the composite material prepared in this example was 157.8 mAh/g at 0.1 C magnification, and the capacity retention rate after 150 cycles was 98.1%. The initial discharge specific capacity of the whole battery made of the coated lithium iron phosphate was 138.2 mAh/g at 1 C magnification, and the capacity retention rate was 97.6% after 150 cycles.

Example 3

(1) Preparation of a polythiophene/graphene/carbon nanotube composite material having a three-dimensional nano-network structure by the method as the same as Example 1, except for ① during the preparation of graphene oxide, the flaky graphite was added and quickly stirred in an ice-water bath for 2 h; an appropriate amount of potassium permanganate was added to continue the stirring in the ice-water bath for 2 h; and ② when the carbon nanotubes were acidified, carbon nanotubes were ultrasonically dispersed in a mixture of concentrated sulfuric acid and concentrated nitric acid and refluxed in an oil bath at 110° C. for 3 h.

The weighing was made according to the following ratio. Polythiophene was in an amount of 60 mass % of the composite material having a three-dimensional nano-network layered structure, and graphene and carbon nanotubes were in a total amount of 40 mass % of the composite material having a three-dimensional nano-network layered structure. According to the method in Example 1, the pyrrole monomer was replaced with a thiophene monomer. The thiophene monomer was added to continue the ultrasonic treatment for 40 min. Ammonium persulfate and acidified carbon nanotubes were added, stirred and polymerized in an ice-water bath for 20 h. The product was centrifuged and vacuum dried at 60° C. to obtain a black powder, which was a polythiophene/graphene/carbon nanotube composite material having a three-dimensional nano-network structure.

(2) Preparation of Lithium Iron Phosphate Coated by a Composite Material Having a Three-Dimensional Nano-Network Layered Structure According to a molar ratio of lithium, iron and phosphorus of 1.03:1:1 and the mass percent of 7% of the composite material having a three-dimensional nano-network layered structure in the coated lithium iron phosphate, the polythiophene/graphene/carbon nanotube composite material having a three-dimensional nano-network structure, ferrous sulfate purified from ferrous sulfate from the by-product of titanium dioxide and phosphoric acid were dispersed in deionized water, wherein the initial concentration of phosphoric acid was 0.25 mol/L, and the molar ratio of P in phosphoric acid and $Fe^{2+}$ in ferrous sulfate was 1.4:1. Oxygen was added to control the pH of the system to 5.5. The reaction was carried out at 80° C. for 10 h. Then quick stirring reaction was carried out until the solution contained no $SO_4^{2-}$, which was detected by barium chloride solution having a mass concentration of 35%. The reactants were filtered, washed for several times, vacuum dried sufficiently at 90° C., then microwave dried at 400° C. for 14 h to obtain anhydrous ferric phosphate in situ homogeneously doped with polythiophene/graphene/carbon nanotube having a three-dimensional nano-network structure.

The above-mentioned doped anhydrous iron phosphate, lithium acetate, a mixture of monocrystal rock sugar and cellulose having a mass percent of 3% of the total mass of the coated lithium iron phosphate and deionized water were mixed uniformly by high energy ball milling to obtain a slurry. The slurry was spray dried, calcined at 800° C. for 10 h in high purity nitrogen added with hydrogen having a volume percent of 1%, to obtain lithium iron phosphate coated by the composite material having a three-dimensional nano-network layered structure.

The discharge specific capacity of the lithium iron phosphate coated by the composite material prepared in this example was 163.1 mAh/g at 0.1 C magnification, and the capacity retention rate after 150 cycles was 98.3%. The initial discharge specific capacity of the whole battery made of the coated lithium iron phosphate was 138.5 mAh/g at 1 C magnification, and the capacity retention rate was 97.8% after 150 cycles.

Example 4

(1) Preparation of a polypyrrole/graphene/carbon nanotube composite material having a three-dimensional nano-network structure by the method as the same as Example 1, except for ① during the preparation of graphene oxide, the flaky graphite was added and quickly stirred in an ice-water bath for 2.5 h; an appropriate amount of potassium permanganate was added to continue the stirring in the ice-water bath for 3 h; and ② when the carbon nanotubes were acidified, carbon nanotubes were ultrasonically dispersed in a mixture of concentrated sulfuric acid and concentrated nitric acid and refluxed in an oil bath at 120° C. for 2 h.

The weighing was made according to the following ratio. Polypyrrole was in an amount of 40 mass % of the composite material having a three-dimensional nano-network layered structure, and graphene and carbon nanotubes were in a total amount of 60 mass % of the composite material having a three-dimensional nano-network layered structure. Other preparation steps were the same as those in Example 1, except for adding an appropriate amount of the surfactant sodium dodecylbenzenesulfonate into the dispersed graphene oxide. The pyrrole monomer was added to continue the ultrasonic treatment for 50 min. Ammonium persulfate and acidified carbon nanotubes were added, stirred and polymerized in an ice-water bath for 22 h. The product was centrifuged and vacuum dried at 60° C. to obtain a black powder, which was a polypyrrole/graphene/carbon nanotube composite material having a three-dimensional nano-network structure.

(2) Preparation of Lithium Iron Phosphate Coated by a Composite Material Having a Three-Dimensional Nano-Network Layered Structure According to a molar ratio of lithium, iron and phosphorus of 1.025:1:1 and the mass percent of 12% of the composite material having a three-dimensional nano-network layered structure in the coated lithium iron phosphate, the polypyrrole/graphene/carbon nanotube composite material having a three-dimensional nano-network structure, ferrous sulfate purified from ferrous sulfate from the by-product of titanium dioxide and sodium phosphate were dispersed in deionized water, wherein the initial concentration of sodium phosphate was 1.05 mol/L, and the molar ratio of P in sodium phosphate and $Fe^{2+}$ in ferrous sulfate was 1.5:1. Hypochlorous acid was added to control the pH of the system to 3. The reaction was carried out at 105° C. for 8 h. Then quick stirring reaction was carried out until the solution contained no $SO_4^{2-}$, which was detected by barium chloride solution having a mass concentration of 35%. The reactants were filtered, washed for several times, vacuum dried sufficiently at 95° C., then microwave dried at 450° C. for 10 h to obtain anhydrous ferric phosphate in situ homogeneously doped with polypyrrole/graphene/carbon nanotube having a three-dimensional nano-network structure.

The above-mentioned doped anhydrous iron phosphate, a mixture of lithium nitrate and lithium carbonate, monocrystal rock sugar having a mass percent of 1% of the total mass of the coated lithium iron phosphate, deionized water and acetone were mixed uniformly by high energy ball milling to obtain a slurry. The slurry was spray dried, calcined at 700° C. for 16 h in high purity argon added with hydrogen having a volume percent of 5%, to obtain lithium iron phosphate coated by the composite material having a three-dimensional nano-network layered structure.

The discharge specific capacity of the lithium iron phosphate coated by the composite material prepared in this example was 161.5 mAh/g at 0.1 C magnification, and the capacity retention rate after 150 cycles was 97.9%. The initial discharge specific capacity of the whole battery made of the coated lithium iron phosphate was 139.4 mAh/g at 1 C magnification, and the capacity retention rate was 97.6% after 150 cycles.

Example 5

(1) Preparation of a Polypyrrole/Graphene/Carbon Nanotube Composite Material Having a Three-Dimensional Nano-Network Structure by the Method as That in Example 1.

The weighing was made according to the following ratio. Polypyrrole was in an amount of 10 mass % of the composite material having a three-dimensional nano-network layered structure, and graphene and carbon nanotubes were in a total amount of 90 mass % of the composite material having a three-dimensional nano-network layered structure. Other preparation steps were the same as those in Example 1, except for adding an appropriate amount of the surfactants cetyltrimethylammonium chloride and sodium dodecyl sulfate into the dispersed graphene oxide. The pyrrole monomer was added to continue the ultrasonic treatment for 55 min. Ammonium persulfate and acidified carbon nanotubes were added, stirred and polymerized in an ice-water bath for 21 h. The product was centrifuged and vacuum dried at 60° C. to obtain a black powder, which was a polypyrrole/graphene/carbon nanotube composite material having a three-dimensional nano-network structure.

(2) Preparation of Lithium Iron Phosphate Coated by a Composite Material Having a Three-Dimensional Nano-Network Layered Structure According to a molar ratio of lithium, iron and phosphorus of 1.005:1:1 and the mass percent of 5% of the composite material having a three-dimensional nano-network layered structure in the coated lithium iron phosphate, the polypyrrole/graphene/carbon nanotube composite material having a three-dimensional nano-network structure, ferrous sulfate purified from ferrous sulfate from the by-product of titanium dioxide and triammonium phosphate were dispersed in deionized water, wherein the initial concentration of triammonium phosphate was 0.8 mol/L, and the molar ratio of P in triammonium phosphate and $Fe^{2+}$ in ferrous sulfate was 1.2:1. Hydrogen peroxide was added to control the pH of the system to 4. The reaction was carried out at 70° C. for 12 h. Then quick stirring reaction was carried out until the solution contained no $SO_4^{2-}$, which was detected by barium chloride solution having a mass concentration of 35%. The reactants were filtered, washed for several times, vacuum dried sufficiently at 95° C., then microwave dried at 500° C. for 6 h to obtain anhydrous ferric phosphate in situ homogeneously doped with polypyrrole/graphene/carbon nanotube having a three-dimensional nano-network structure.

The above-mentioned doped anhydrous iron phosphate, a mixture of lithium nitrate and lithium carbonate, a mixture of monocrystal rock sugar and sucrose having a mass percent of 5% of the total mass of the coated lithium iron phosphate and deionized water were mixed uniformly by high energy ball milling to obtain a slurry. The slurry was spray dried, calcined at 750° C. for 14 h in high purity nitrogen added with hydrogen having a volume percent of 3%, to obtain lithium iron phosphate coated by the composite material having a three-dimensional nano-network layered structure.

The discharge specific capacity of the lithium iron phosphate coated by the composite material prepared in this example was 162.4 mAh/g at 0.1 C magnification, and the capacity retention rate after 150 cycles was 98.2%. The initial discharge specific capacity of the whole battery made of the coated lithium iron phosphate was 138.4 mAh/g at 1 C magnification, and the capacity retention rate was 97.9% after 150 cycles.

Example 6

(1) Preparation of a polythiophene/graphene/carbon nanotube composite material having a three-dimensional nano-network structure by the method as the same as Example 2, except for that polythiophene was in an amount of 5 mass % of the composite material having a three-dimensional nano-network layered structure, and graphene and carbon nanotubes were in a total amount of 95 mass % of the composite material having a three-dimensional nano-network layered structure.

(2) Preparation of Lithium Iron Phosphate Coated by a Composite Material Having a Three-Dimensional Nano-Network Layered Structure According to a molar ratio of lithium, iron and phosphorus of 1.01:1:1 and the mass percent of 3% of the composite material having a three-dimensional nano-network layered structure in the coated lithium iron phosphate, the polythiophene/graphene/carbon nanotube composite material having a three-dimensional nano-network structure, ferrous sulfate purified from ferrous sulfate from the by-product of titanium dioxide and phosphoric acid were dispersed in deionized water, wherein the initial concentration of phosphorus source was 0.6 mol/L, and the molar ratio of P in phosphoric acid and $Fe^{2+}$ in ferrous sulfate was 1.3:1. Oxygen was added to control the pH of the system to 2. The reaction was carried out at 85° C. for 20 h. Then quick stirring reaction was carried out until the solution contained no $SO_4^{2-}$, which was detected by barium chloride solution having a mass concentration of 35%. The reactants were filtered, washed for several times, vacuum dried sufficiently at 100° C., then microwave dried at 450° C. for 20 h to obtain anhydrous ferric phosphate in situ homogeneously doped with polythiophene/graphene/carbon nanotube having a three-dimensional nano-network structure.

The above-mentioned doped anhydrous iron phosphate, a mixture of lithium oxalate and lithium acetate, a mixture of poly(sugar alcohol) and polyethylene glycol having a mass percent of 7% of the total mass of the coated lithium iron phosphate, deionized water and anhydrous ethanol were mixed uniformly by high energy ball milling to obtain a slurry. The slurry was spray dried, calcined at 780° C. for 10 h in high purity argon, to obtain lithium iron phosphate coated by the composite material having a three-dimensional nano-network layered structure.

The discharge specific capacity of the lithium iron phosphate coated by the composite material prepared in this example was 159.3 mAh/g at 0.1 C magnification, and the capacity retention rate after 150 cycles was 98.2%. The initial discharge specific capacity of the whole battery made of the coated lithium iron phosphate was 140.2 mAh/g at 1 C magnification, and the capacity retention rate was 98% after 150 cycles.

According to the disclosure in the description above, those skilled in the art can make suitable changes and modifications to the embodiments above. Thus, the present invention is not limited to the specific embodiments described above in the description. Some changes and modifications to the present invention shall belong to the protection scope claimed in the claims of the present invention.

The invention claimed is:

1. A lithium iron phosphate coated by a composite material having a three-dimensional nano-network layered structure, wherein the composite material is prepared by compounding a conducting polymer, graphene and a carbon nanotube.

2. The lithium iron phosphate coated by a composite material according to claim 1, wherein the conducting polymer is in an amount of 45-99.99 mass % of the composite material.

3. The lithium iron phosphate coated by a composite material according to claim 1, wherein the conducting polymer is one selected from the group consisting of polypyrrole, polyaniline, polythiophene and polyoxyethylene, or a mixture of two or more selected therefrom, or a copolymer of two or more selected from the aforesaid polymer monomers;

said carbon nanotube is one selected from the group consisting of single-wall or multi-wall carbon nanotubes, or a mixture of two or more selected therefrom.

4. The lithium iron phosphate coated by a composite material according to claim 1, wherein the composite material is prepared by the following process, comprising, (1) adding a surfactant into dispersed graphene oxide, dispersing, then adding hydrazine hydrate, making the surfactant form micelle between the graphene layers during the process that graphene oxide is reduced by hydrazine hydrate, separating the product, to remove excessive surfactant, to obtain a reduced graphene which forms micelle between the graphene layers;

(2) dispersing the separated product in step (1) in a solvent and conducting ultrasonic treatment, then adding a conducting polymer or a monomer thereof, continuing the ultrasonic treatment for 30-60 min, adding ammonium persulphate and carbon nanotubes, stirring in an ice-water bath for polymerization for 18-24 h, separating the product and drying to obtain a conducting polymer/graphene/carbon nanotube composite material having a three-dimensional nano-network layered structure.

5. The lithium iron phosphate coated by a composite material according to claim 4, wherein the surfactant in step (1) is one selected from the group consisting of cetyltrimethylammonium bromide, cetyltrimethylammonium chloride, sodium dodecyl sulfate and sodium dodecylbenzenesulfonate, or a mixture of two or more selected therefrom;
said dispersion is carried out by ultrasonic waves;
said carbon nanotubes in step (2) are added together with hydrazine hydrate during the process of preparing the reduced graphene in step (1).

6. A preparation process for the lithium iron phosphate coated by a composite material having a three-dimensional nano-network layered structure according to claim 1, comprising the following steps of in-situ doping the composite and anhydrous ferric phosphate during the process of preparing the anhydrous ferric phosphate, serving as a lithium iron phosphate precursor, then mixing the composite in-situ doped anhydrous ferric phosphate, a lithium source, a traditional carbon material and a solvent by high energy ball milling to obtain a slurry, spray drying the slurry, and calcining to obtain a lithium iron phosphate coated by the composite material.

7. The preparation process according to claim 6, wherein the preparation process comprises the following steps:
(1) dispersing the composite material, ferrous sulfate and a phosphorus source in deionized water, adding an oxidant, reacting until no $SO4^{2-}$ is detected in the solution, filtering, washing the reactant, vacuum drying and microwave drying successively to obtain an anhydrous ferric phosphate homogeneously doped in-situ by the composite material;
(2) mixing said anhydrous ferric phosphate homogeneously doped in-situ by the composite material in step (1), a lithium source, a traditional carbon material and a solvent by high energy ball milling to obtain a slurry, spray drying the slurry, and calcining to obtain a lithium iron phosphate coated by the composite material having a three-dimensional nano-network layered structure.

8. The preparation process according to claim 7, wherein said ferrous sulfate in step (1) is a product purified from ferrous sulfate from the by-product of the titanium dioxide plant;
said reaction is carried out under rapid stirring at a temperature of 25-105° C. for 0.5-25 h;
said vacuum drying is carried out at 80-100° C. for 3-20 h;
said microwave drying is carried out at 300-550° C. for 3-20 h.

9. The preparation process according to claim 7, wherein the lithium source in step (2) is one selected from the group consisting of lithium chloride, lithium bromide, lithium phosphate, lithium dihydrogen phosphate, dilithium hydrogen phosphate, lithium sulfate, lithium carbonate, lithium hydroxide, lithium acetate, lithium nitrate, lithium oxalate, lithium formate, lithium tert-butoxide, lithium benzoate and Lithium citrate.

10. A lithium ion battery, wherein the cathode active substance of the lithium ion battery comprises the lithium iron phosphate coated by a composite material having a three-dimensional nano-network layered structure according to claim 1, or the lithium iron phosphate coated by a composite material having a three-dimensional nano-network layered structure, which is prepared by the process according to claim 6.

11. The lithium iron phosphate coated by a composite material according to claim 1, wherein said graphene and carbon nanotube are in an amount of 0.01-55 mass % of the composite material.

12. The lithium iron phosphate coated by a composite material according to claim 1, wherein said composite material is in an amount of 0.01-15 mass % of the coated lithium iron phosphate.

13. The lithium iron phosphate coated by a composite material according to claim 1, wherein preferably, lithium, iron and phosphorus in the coated lithium iron phosphate are in a molar ratio of 0.99-1.03:1:1.

14. The lithium iron phosphate coated by a composite material according to claim 4, wherein said solvent is one selected from the group consisting of ethanol, deionized water, inorganic protonic acid and chloroform solution offerric chloride, or a mixture of two or more selected therefrom;
said carbon nanotubes are acidized; and
said drying is carried out under vacuum at a temperature of 40-80° C.

15. The preparation process according to claim 7, wherein said phosphorus source is one selected from the group consisting of phosphoric acid, ammonium dihydrogen phosphate, diammonium phosphate, triammonium phosphate, and phosphates of sodium, potassium and lithium, or a combination of two or more selected therefrom;
the initial concentration of the phosphorus source ranges from 0.04 mol/L to 1.05 mol/L;
P in said phosphorus source and $Fe^{2+}$ in ferrous sulfate have a molar ration of 1.01-1.55:1.

16. The preparation process according to claim 7, wherein said oxidant is one selected from the group consisting of hydrogen peroxide, sodium chloride, sodium hypochlorite, hypochlorous acid, oxygen, air, ozone-containing oxygen and ozone-containing air, or a combination of two or more selected therefrom;
the oxidant is added in an amount for controlling the pH of the system to be 1-6.

17. The preparation process according to claim 7, wherein said detection is carried out by using a soluble barium salt.

18. The preparation process according to claim 7, wherein said traditional carbon material is a soluble carbon-containing organic binder.

19. The preparation process according to claim 7, wherein anyone selected from the group consisting of glucose, sucrose, cellulose, polyethylene glycol, polyvinyl alcohol, soluble starch, monocrystal/polycrystal crystal sugar, fructose, phenolic resin, vinyl pyrrolidone, epoxy resin, poly (sugar alcohol), polyvinylidene fluoride, polyvinyl chloride, urea-formaldehyde resin, polymethacrylate and furan resin, or a combination of two or more selected therefrom;
said traditional carbon material is in an amount of 0.1-10 mass % of the coated lithium iron phosphate.

20. The preparation process according to claim 7, wherein said solvent is one selected from the group consisting of deionized water, anhydrous ethanol, diethyl ether, acetone, tetrahydrofuran, benzene, toluene or dimethylformamide, or a combination of two or more selected therefrom;
said calcination is carried out at 650-850° C. for 6-20 h.

* * * * *